(12) United States Patent
Bowman et al.

(10) Patent No.: US 8,316,893 B2
(45) Date of Patent: Nov. 27, 2012

(54) FASTENING OF PIPES

(75) Inventors: Jeremy Bowman, Chesterfield (GB); David Charles Harget, Nottingham (GB)

(73) Assignee: Uponor Innovation AB (SE)

( * ) Notice: Subject to any disclaimer, the term of this patent is extended or adjusted under 35 U.S.C. 154(b) by 651 days.

(21) Appl. No.: 12/298,125

(22) PCT Filed: Apr. 23, 2007

(86) PCT No.: PCT/GB2007/001478
§ 371 (c)(1),
(2), (4) Date: Jun. 8, 2009

(87) PCT Pub. No.: WO2007/125296
PCT Pub. Date: Nov. 8, 2007

(65) Prior Publication Data
US 2010/0000622 A1 Jan. 7, 2010

(30) Foreign Application Priority Data
Apr. 24, 2006 (GB) .................................. 0608038.6

(51) Int. Cl.
*F16L 11/00* (2006.01)
(52) U.S. Cl. .......... 138/110; 138/106; 138/137; 138/109
(58) Field of Classification Search .................. 138/137, 138/140, 110, 109, 106
See application file for complete search history.

(56) References Cited

U.S. PATENT DOCUMENTS

| | | | | |
|---|---|---|---|---|
| 3,387,345 A * | 6/1968 | Savoir | ............................. | 24/446 |
| 3,613,737 A * | 10/1971 | Schoening | .................... | 138/149 |
| 4,850,396 A | 7/1989 | McClish | ........................ | 138/103 |
| 4,939,818 A * | 7/1990 | Hahn | .............................. | 24/16 R |
| 4,987,018 A * | 1/1991 | Dickinson et al. | ........... | 428/36.9 |
| 5,285,818 A | 2/1994 | Hummert | ....................... | 138/107 |
| 5,368,341 A * | 11/1994 | Larson | .......................... | 285/260 |
| 5,401,301 A | 3/1995 | Schulmerich | ..................... | 96/71 |
| 5,656,351 A | 8/1997 | Donaruma | ....................... | 428/97 |
| 5,848,926 A | 12/1998 | Jardetzky et al. | .............. | 446/85 |
| 5,967,194 A | 10/1999 | Martin | .......................... | 138/156 |
| 6,016,849 A * | 1/2000 | Harget et al. | ................. | 138/141 |
| 6,286,876 B1 * | 9/2001 | Jasperse et al. | .............. | 285/260 |
| 6,660,121 B2 | 12/2003 | Harvey | ..................... | 156/244.27 |
| 6,830,075 B1 | 12/2004 | McKinney | .................... | 138/106 |
| 6,953,396 B2 * | 10/2005 | Paschke et al. | .............. | 454/306 |
| 7,544,404 B2 * | 6/2009 | McMahon | .................. | 428/34.9 |
| 2005/0051225 A1 * | 3/2005 | Monden et al. | .............. | 138/114 |

FOREIGN PATENT DOCUMENTS

| | | |
|---|---|---|
| DE | 8911102 | 3/1990 |
| DE | 20107243 | 9/2001 |
| EP | 1136535 | 5/2004 |
| GB | 1141489 | 1/1969 |
| GB | 1156352 | 6/1969 |
| GB | 1196655 | 7/1970 |
| GB | 1212589 | 11/1970 |
| JP | 59078825 | 5/1984 |
| JP | 2001-070011 | 3/2001 |
| WO | WO 2004016976 | 2/2004 |

* cited by examiner

*Primary Examiner* — Patrick F Brinson
(74) *Attorney, Agent, or Firm* — Knobbe, Martens, Olson & Bear, LLP

(57) ABSTRACT

A plastics pipe provided with engageable fastener elements on an outer surface thereof, a method for manufacturing the pipe, and a fastener system comprising inter-engageable fastener elements on an outer surface of a pipe and a support therefore.

18 Claims, No Drawings

FASTENING OF PIPES

RELATED APPLICATIONS

The present application is the U.S. National Phase under 35 U.S.C. §371 of International Application PCT/GB2007/001478, filed Apr. 23, 2007, which claims priority under 35 U.S.C. §119(a) and §365(b) to Great Britain Patent Application No. GB 0608038.6, filed Apr. 24, 2006.

FIELD OF THE INVENTION

This invention relates to the fastening of pipes, more particularly to a novel plastics pipe, a fastening means for mounting the pipe on a support and a method for manufacturing the novel pipe.

BACKGROUND TO THE INVENTION

Plastics pipes are widely employed in the fluid distribution networks of, for example, the gas and water industries and in irrigation and sewage treatment. In addition, the telecommunications and electricity industries are increasingly deploying plastics pipes as ducting for cables. A widespread use of plastics pipes is in domestic heating systems, in particular for hot water pipes, and especially for under-floor heating. In the installation of these pipe networks there is frequently a need to position or anchor lengths of plastics pipe on a support, to obtain an even heating within the room or building.

A wide range of fastening devices and systems are available for positioning or anchoring a plastics pipe on a support. Typically these consist of brackets or other fastening means that encircle the pipe and can be fixed to the support by screws, bolts, or other fasteners. Whilst such devices can work well in practice, they are dependent on having a support that is suitable for receiving the screws or bolts, have parts that are easily mislaid and inevitably are time-consuming to install.

Where the supporting surface is too soft, too hard, or insufficiently rigid, for the use of screws or bolts, other techniques must be employed. For example, in the installation of pipe networks for underfloor heating, an insulating layer of expanded polystyrene (EPS) boards is first laid down to form a supporting surface. A serpentine network of plastics pipes is then laid in position on the EPS surface and a layer of concrete poured over the network to cover the pipe network and complete the installation. During the assembly of the network and pouring of the concrete it is essential that the individual plastics pipes are anchored so that they do not move from their assigned positions. To this end it is known to provide EPS boards with spaced apart integrally moulded upstanding posts that define the positions of the plastics pipes in the network. However this system is somewhat inflexible, in that the posts cannot be moved once the EPS boards have been laid in position, for example, where it is necessary to make small adjustments in the position or orientation of the pipes.

Hook and loop type separable fasteners are well known and are used to join two members detachably to each other. These types of fasteners generally have two components disposed on opposing member surfaces. One component typically includes a plurality of resilient hooks while the other component typically includes a plurality of loops. When the two components are pressed together they interlock to form a releasable engagement. In this specification, such components are termed "inter-engageable". The resulting joint created by the releasable engagement is relatively resistant to shear and pull forces and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relatively to each other in a direction parallel to their plane of contact. The term "pull force" refers to an action or stress resulting from applied forces that causes or tends to cause two contiguous parts of a body to move relatively to each other in a direction perpendicular to their plane of contact. Hook and loop fasteners can, for example, comprise mating strips or patches of filamentary stress-bearing hooks and loops.

As described in U.S. Pat. No. 5,656,351, monofilament or multifilament loops are knit or woven into a textile backing, or ground, to form the loop component of the fastener. To form the hook component, monofilament loops are woven in the same manner, then passed through a hook cutting process in which portions of the monofilament loops are cut away to form hooks.

In an alternative method, as described in U.S. Pat. No. 6,660,121, fastener elements integral with a base web are moulded continuously from a flowable resin, by providing a cylindrical mould roll rotatable about an axis of rotation and defining an array of fastener element-shaped mould cavities in a peripheral surface thereof; and applying operating pressure to force resin into said cavities at a mould gap defined adjacent the peripheral surface of the mould roll, to form said fastener elements, while supporting the mould roll with a support member on the side of said mould roll generally opposite the mould gap, the support member arranged to apply a force to the mould roll along its peripheral surface for resisting radial deflection of the mould roll caused by said operating pressure, to maintain the mould gap at a desired thickness profile across the width of the base web under said operating pressure. The use of the fastener elements to secure pipes in position is not disclosed.

In GB1196655 there is described a fastener comprising a pair of inter-engageable articles each having a base from which project a multiplicity of spine-like elements, each comprising an enlarged head at the end of a resiliently flexible stem, the heads being unordered, so that when the articles are inter-engaged a majority of the element heads of each article are held beneath the element heads of the other article over the area of engagement. The fasteners can be fabricated by injection moulding, compression moulding, progressive stamping and die forming, casting, investment moulding, embossing, vacuum forming and flocking. The use of the fasteners to secure pipes in position is not disclosed.

In JP59078825 there is described a light-weight cable in a stable flocked state that is obtained by a method wherein a synthetic resin pipe is widened from a cut-out part in the axial direction thereof to effect flocking through electrostatic processing, and the widened part is then restored to the original pipe state. The use of flock coating to produce a fastener element is not disclosed.

GB 1141489 describes a method of providing flat or shaped surfaces with a flock coating, comprising first providing the surface that is to be coated with an adhesive coating and then applying fibres of synthetic or natural material which have been cut to appropriate lengths and which are to form the flock coating to the adhesive coating, characterised in that the fibres are introduced under pressure into a closed container in which the fibres are dispersed to a distribution resembling a cloud by intense agitation generated by an oscillatably suspended or irregularly moving element, a blast of compressed air through a chamber communicating with said container then blowing the fibres entering said chamber past a member located in the chamber and maintained at a high potential, and through a deflector onto the adhesive coating previously applied to the surface, which is at earth potential, of the object that is to be coated. The use of flock coating to produce a fastener is not disclosed.

The entire disclosures of all the abovementioned patents are incorporated herein by reference for all purposes.

There is an unfulfilled need for a more versatile fastener system adapted to secure a pipe in an assigned location on a support, that is quick and easy to install, can be readily assembled and disassembled and can be used with a variety of support surfaces.

SUMMARY OF THE INVENTION

The present invention provides a plastics pipe provided with engageable fastener elements on an outer surface thereof, a method for manufacturing the pipe, and a fastener system comprising inter-engageable fastener elements on an outer surface of a pipe and a support therefore.

In a first aspect, the present invention provides a plastics pipe having a plurality of engageable fastener elements distributed on an outer surface thereof.

In a second aspect, the invention provides a method for manufacturing a plastics pipe having a plurality of engageable fastener elements distributed on an outer surface thereof, which comprises either (a) coating the pipe surface with an adhesive substrate, or (b) heating the pipe surface to render the surface tacky, and directing the fastener elements towards the pipe surface to form a flock coating of the fastener elements on the surface of the pipe.

In a third aspect, the invention provides a fastening system for a plastics pipe, which comprises a plurality of first fastener elements distributed on an outer surface of the pipe and a plurality of second fastener elements inter-engageable with the first fastener elements and distributed on a support surface for the plastics pipe.

In accordance with a further aspect of the invention, the fastener elements are preferably distributed on only a minor portion of the outer surface of the plastics pipe, preferably in a circumferentially directed stripe.

In a still further aspect, the present invention provides an apparatus for flock coating a plastics pipe, wherein the flock coating comprises engageable fastener elements, the apparatus being provided with means for producing an electric field, means for introducing a plurality of engageable fastener elements into the field, either (a) means for coating a plastics pipe with an adhesive substrate, or (b) means for heating a plastics pipe in order to render its outer surface tacky, and means for conveying the plastics pipe through the electric field such that the fastener elements are deposited onto the extruded pipe to produce a flock coating of engageable fastener elements thereon.

Whilst the invention can be applied to a wide range of plastics pipes and to many different situations, it is particularly suitable for use with composite plastics pipes having an inner core and an outer removable protective layer, and will henceforth be more particularly described with reference thereto. It is to be understood, however, that the invention is not limited to such plastics pipes and can also be applied to pipes wherein the pipe wall is a single layer and to composite pipes wherein the outer layer is not removable.

The preferred composite plastics pipes for use in the present invention have an outer protective layer that can be removed, for example, by peeling, in order to expose a clean, unoxidised surface of the inner core suitable for connection, for example, by electrofusion welding. Such pipes, and methods for their manufacture and use, are disclosed, for example, in GB 2297137, GB2297138, WO 04/016976, WO 04/016420 and WO 04/016421 the entire disclosures of which are incorporated herein by reference for all purposes.

Each of the layers of the composite plastics pipe can comprise any suitable thermoplastic polymeric material, consistent with the maintenance of the required end-use properties. Suitable polymeric materials include, for example, olefinically-unsaturated polymers and co-polymers, for example, polyolefins such as polyethylene, polypropylene, polybutene and polybutylene; ethylene and propylene co-polymers, for example, ethylene-vinyl acetate polymers, and propylene-vinyl acetate polymers; halogenated-vinyl polymers such as vinyl chloride polymers and co-polymers; polyamides, for example, nylon 6, nylon 11 and nylon 66; polycarbonates; ABS polymers and ionomer polymers such as Surlyn (RTM). Block co-polymers and blends of any of the above polymers can also be used. The polymeric material can also be cross-linked where appropriate. Suitable cross-linked polymeric materials include, for example, cross-linked polyolefins, for example, cross-linked polyethylene (PEX).

The inner core of the pipe can comprise a polymeric material chosen to be compatible with the particular application, and especially with the fluid material to be conveyed by the pipe. For many applications polyethylene is the preferred material for the inner core. The grade of polyethylene chosen, that is to say, high density, medium density, low density, or linear low density, will depend upon the particular application. For example, suitable grades of polyethylene for pressure pipe applications preferably meet the requirements of at least one of prEN 12201-1, prEN12201-2, prEN1555-1 and prEN1555-2. The polyethylene inner core can be cross-linked as required, for example, to a cross link density of from 40 to 95%.

Any suitable equivalent grade of polyethylene may, of course, also be used.

The outer protective layer of the composite plastics pipe is preferably formed from a polymeric material or a blend of polymeric materials, which may contain beneficial additives, having good mechanical and physical properties, especially toughness and low temperature impact strength, together with an ability to receive quantities of stabilising materials, in particular UV stabilisers, sufficient to protect the underlying layer(s) and/or the inner core.

Preferred polymeric materials for the outer protective layer comprise propylene homo- and co-polymers, propylene block co-polymers, and propylene random co-polymers.

The plastics pipe can have any suitable diameter and wall thickness, although the invention is particularly suitable for plastics pipes for hot water and under-floor heating. Such pipes preferably have a diameter of from 8 mm to 63 mm, more preferably from 12 mm to 25 mm, and a wall thickness preferably from 1 mm to 6 mm, more preferably from 2 mm to 5 mm. When applied to composite pipes it will be appreciated that the outer skin, carrying the fastener elements is removable when necessary, for example, for electrofusion jointing, and the exposed core pipe can have a nominal diameter suitable for insertion into an electrofusion coupler. Thus in such pipes the presence of the fastener elements need not interfere with the jointing of the pipe.

A plastics pipe of the first aspect of the invention has a plurality of engageable fastener elements distributed on at least a portion of its outer surface. In this specification the term "engageable" is intended to mean that the fastener elements on the outer surface of the pipe can releasable interconnect with a plurality of fastener elements on a support surface by mechanical interaction. Thus a fastener element is "engageable" or "inter-engageable" if it is capable of mechanical engagement with a like or co-operable fastening element on another member such that the pipe and member are mechanically joined together. The fastener elements are preferably upstanding discrete elements having a base mounted on the outer surface of the pipe. This is not, however, essential, and the fastener elements can comprise, for example, a non-woven fabric comprising a plurality of looped fibres adapted to cooperate with a plurality of hooks on a support surface. In general, at least the fastener elements on one of the surfaces to be joined will be discrete upstanding elements, however. Thus the fastener elements can be hook or loop releasable fastener elements, for example, as described in U.S. Pat. Nos. 6,660,121, 6,551,539 or 5,260,015. Generally the hook elements will be on one surface and the loop elements on the other. Thus, for example, the hook elements can be distributed on the pipe surface and the loop elements on the support surface, or vice versa. The hook and/or loop elements can be activated to change in shape, orientation, flexural modulus, or a combination thereof to effectively reduces the shear and/or pull off forces in the releasable engagement, for example, as described in US 2004074068, US 2004117955, US 2004074064 or US 2004074062. Alternatively the fastener elements can comprise randomly distributed spine-like elements, each comprising an enlarged head at the end of a resiliently flexible stem, as described in GB1196655.

The number, length, diameter, shape and stiffness of the fastener elements can be chosen to meet the requirements of the particular application. Usually, however, the fastener elements will number many hundreds and will have a density of from 10 to 1000 fastener elements per $cm^2$, preferably from 50 to 500 fastener elements per $cm^2$.

The distribution of the fastener elements on the pipe surface and the support surface is such that they form an array covering at least a portion, and in one embodiment the whole, of the respective mating surfaces. The hook and loop elements can be randomly distributed on their respective mating surfaces, or arranged in regular arrays.

The fastener elements can be formed and distributed on the respective surfaces by any suitable method, for example, by moulding, stamping, casting, or vacuum forming, but in a preferred method according to the invention, the fastener elements are distributed on one or both of the respective surfaces by flock coating. In this method, the fastener elements are distributed on the surface in an orientation perpendicular thereto by spraying, by a suitable distribution means, for example, a screw helix or vibrator, or by aligning the fastener elements in an electrostatic field. The surface is treated so that the fastener elements adhere on contact therewith, for example, by heating the surface to its melting temperature, or by coating the surface with an adhesive layer. One suitable method of flock coating is described in GB 1196655, in which rods without heads are flocked onto a surface by a vibratory flocking technique, the surface being either in a molten condition or coated with an adhesive. This produces a distributed array of rods oriented substantially perpendicular to the surface but in otherwise unordered positions. In a subsequent operation, the rods are formed into heads or cam elements as appropriate. Alternatively stems with enlarged heads at each end can be flocked onto the surface and affixed thereto. Other suitable methods of flock coating, using an electrostatic field or pneumatic action are described, for example, in GB 1156352, GB 1285926 and GB 1201704.

The fastening elements comprising the flock coating can be formed, for example, from short monofilament polymer fibres, strands, stems or rods. Suitable polymers include nylon, rayon and polyester materials. The diameter of the individual fibres is preferably in the range of from 0.25 mm to 5.0 mm. The fibres may be shaped into hooks, loops or other fastening means by the methods previously described.

The pipe or support surface can be coated with a one or two part adhesive to receive the flocked fastening elements. Suitable adhesives include water-based latex adhesives, for example, polychloroprene, polyurethane resin, PVA emulsion, VAE emulsion, acrylic co-polymer emulsions, SBR latex, natural rubber, nitrile latex and cellulosic adhesives; solvent-based adhesives, for example, polyurethane, polychloroprene, natural rubber, nitrile rubber and SBR rubber adhesives; and hot melt adhesives, for example, polyvinyl acetate and polyamide adhesives.

In a preferred embodiment of the invention, the fastening elements are distributed in one or more stripes, preferably circumferentially directed stripes. The stripes can be continuous or discontinuous and can extend all or part way around the circumference of the pipe. The width of the stripes can be constant or can vary, for example, along the length of the pipe. The stripes are preferably straight, although a single stripe could also form a spiral around the pipe. By restricting the fastening elements to a stripe on the outer surface of the plastics pipe the additional costs of the fastening elements can be kept to a minimum and the effect, if any, on the mechanical properties of the pipe can also be kept to a minimum. The width of the stripes will depend, to some extent, on the configuration of the pipe network and support surface, but is usually in the range of from 30 to 1 mm, and more preferably from 10 to 5 mm.

Composite pipes in accordance with a preferred aspect of the invention are produced on extrusion lines with multiple extruders and since it is possible to apply the flock coating of fastening elements to the pipe body in-line, the additional processing costs of providing the fastening elements are very small.

In a preferred method according to the invention, the fastening elements are deposited on the plastics pipe by an in-line method wherein the hopper containing the fastening elements is positioned downstream of the extruders and the fastening elements are deposited onto the surface of the extruded pipe before it leaves the extrusion line. Of course this is not essential and it would also be possible to deposit the fastening elements on to cut lengths of the plastics pipe in a separate flock coating step.

The flock coating method of the invention can produce releasably securable pipes at high-efficiency and low operating cost. The method can be operated at high speed, is easy to automate and is easy to integrate into conventional extrusion lines.

An embodiment of a plastics pipe and method according to the invention will now be described, by way of example only, in the following Example:

EXAMPLE

A composite plastics pipe of diameter 40 mm and nominal wall thickness 3.8 mm manufactured by Uponor Limited and sold under the trade mark ProFuse was used for the present experiments. ProFuse comprises a core pipe, a protective skin layer and a stripe. The core pipe is made from unpigmented PE 100 polyethylene material and is designed to meet all the requirements of the specific industry (other than pigmentation and marking). The protective skin layer is a polypropylene layer that is designed to adhere lightly to the core and to be removable when required, for example, for electrofusion jointing. The skin is pigmented to meet the industry requirements, dark blue for water, yellow for gas, and brown or black for sewage, and is stabilized for UV protection and light fastness.

A length of the composite pipe was coated with a flock adhesive and sprayed with hook-shaped fibres using an air compressor, reservoir and spray gun. The fibres were attracted to the pipe as the pipe was arranged to have an electrical polarity opposite to that of the spray gun. The resultant pipe had an outer surface with an array of upstanding hook-shaped fibres deposited thereon and firmly anchored thereto. A length of foam polystyrene board was similarly coated with adhesive and sprayed with loop-shaped fibres. After the adhesive had hardened it was found that the pipe and support could form a firm connection when pressed together, but could be separated by hand using a peeling action.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A composite plastics pipe having an inner core and an outer removable protective layer, the pipe further including a plurality of engageable fastener elements distributed on an outer surface thereof, wherein the fastener elements are distributed on the outer surface of the pipe by flock coating.

2. A plastics pipe according to claim 1, wherein the fastener elements are distributed on only a minor portion of the outer surface of the plastics pipe, preferably in a circumferentially directed stripe.

3. A plastics pipe according to claim 1, wherein the outer protective layer can be removed by peeling, in order to expose a clean, unoxidised surface of the inner core suitable for connection by electrofusion welding.

4. A plastics pipe according to claim 1, wherein the inner core comprises polyethylene or an ethylene copolymer and the outer protective layer comprises a propylene homo- or co-polymer, a propylene block co-polymer, or a propylene random co- polymer.

5. A plastics pipe according to claim 1, wherein the inner core comprises a cross-linked polyolefin.

6. A plastics pipe according to claim 1, wherein the plastics pipe is for use for hot water and under-floor heating.

7. A plastics pipe according to claim 1, which has a diameter of from 8 mm to 63 mm, and a wall thickness of from 1 mm to 6 mm.

8. A plastics pipe according to claim 1, wherein the fastener elements are upstanding discrete elements having a base mounted on the outer surface of the pipe.

9. A plastics pipe according to claim 1, wherein the fastener elements are hook or loop releasable fastener elements.

10. A plastics pipe according to claim 1, wherein the fastener elements comprise randomly distributed spine-like elements, each comprising an enlarged head at the end of a resiliently flexible stem.

11. A plastics pipe according to claim 1, wherein the fastener elements have a density of from 10 to 1000 fastener elements per $cm^2$.

12. A plastics pipe according to claim 1, wherein the fastening elements comprising the flock coating are formed from short monofilament polymer fibres, strands, stems or rods.

13. A plastics pipe according to claim 1, wherein the pipe is coated with an adhesive to receive the flocked fastening elements.

14. A plastics pipe according to claim 1, wherein the fastening elements are distributed in one or more stripes, preferably circumferentially directed stripes.

15. A plastics pipe according to claim 14, wherein the width of a stripe is in the range of from 30 to 1 mm.

16. A plastics pipe according to claim 7, wherein the plastics pipe has a diameter of from 12 mm to 25 mm and a wall thickness of from 2 mm to 5 mm.

17. A plastics pipe according to claim 11, wherein the fastener elements have a density of from 50 to 500 fastener elements per $cm^2$.

18. A plastics pipe according to claim 15, wherein the width of a stripe is in the range of from 10 to 5 mm.

* * * * *